United States Patent [19]
Belan

[11] Patent Number: 4,958,596
[45] Date of Patent: Sep. 25, 1990

[54] PET GROOMING KIT WITH APPLICATOR

[76] Inventor: Katalin Belan, 2450 NE. 135th St., #705, North Miami, Fla. 33181

[21] Appl. No.: 457,149

[22] Filed: Dec. 26, 1989

[51] Int. Cl.$^5$ .............................................. A01K 13/00
[52] U.S. Cl. .......................................... 119/86; 119/83
[58] Field of Search .............. 119/156, 157, 158, 159, 119/160, 83, 87, 86; 132/112, 113, 114, 115, 116, 120

[56] References Cited

U.S. PATENT DOCUMENTS

| | | | |
|---|---|---|---|
| 2,532,001 | 11/1950 | Williams | 119/86 |
| 3,101,086 | 8/1963 | Di Vito | 132/114 |
| 3,147,757 | 9/1964 | Hofmann | 132/120 |
| 3,457,928 | 7/1969 | Kurshenoff | 132/113 |
| 4,024,880 | 5/1977 | Newton et al. | 119/1 |
| 4,044,724 | 8/1977 | Merchill | 132/112 X |
| 4,213,423 | 7/1980 | Bryan et al. | 119/159 X |

FOREIGN PATENT DOCUMENTS 850041 7/1981 U.S.S.R. .............................. 132/120

Primary Examiner—Gene Mancene
Assistant Examiner—R. Thomas Price
Attorney, Agent, or Firm—Malloy, Downey & Malloy

[57] ABSTRACT

A pet grooming kit comprising an array of treatment liquids stored in flexible containers including, but not limited to, shampoo, cologne and flea dip. The kit further comprises a liquid applicator generally in the form of a brush and adapted to be threadably connected to the flexible containers, the applicator being structured to receive liquid from the containers and thereafter disburse the liquid from the ends of bristles on the applicator during brushing of an animal's coat.

9 Claims, 1 Drawing Sheet

U.S. Patent  Sep. 25, 1990  4,958,596
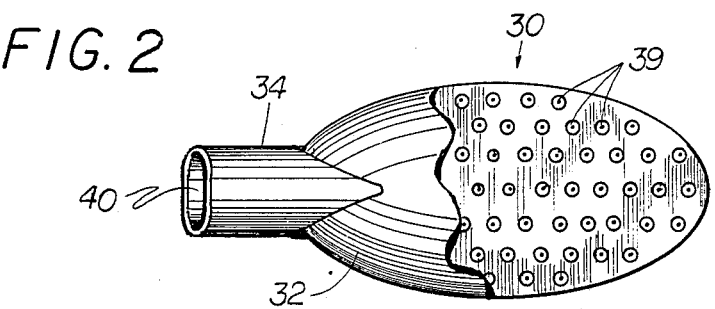
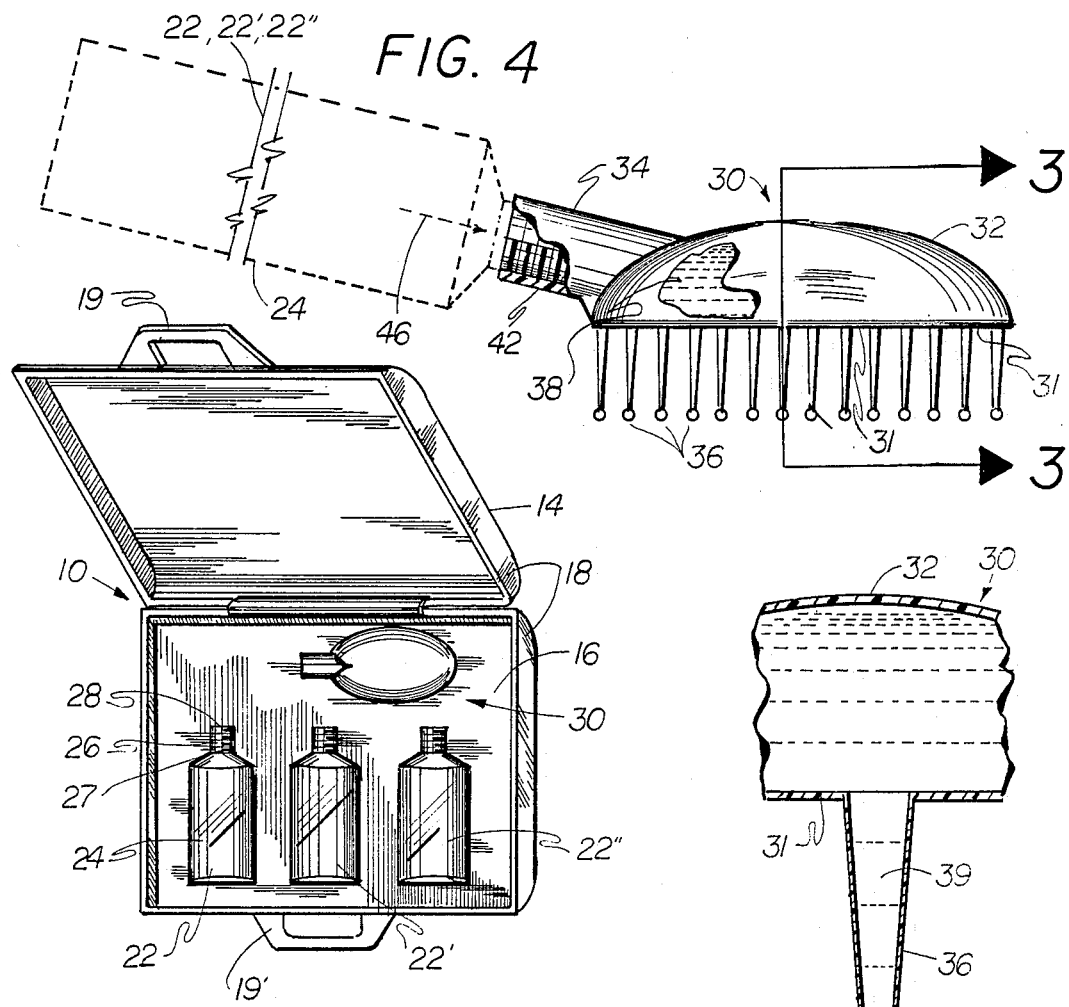
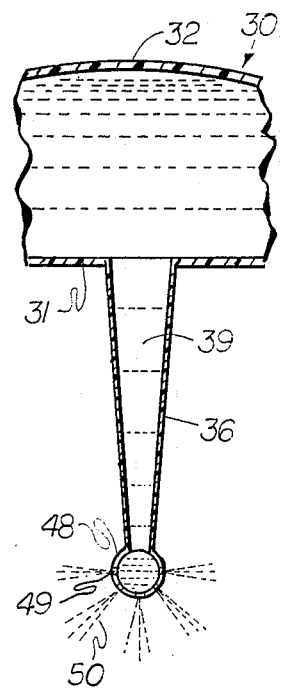

PET GROOMING KIT WITH APPLICATOR

BACKGROUND OF THE INVENTION

1. Field of the Invention

This invention relates to a pet grooming kit to facilitate the application of shampoo, flea dip and other related pet treatment substances during brushing of an animal's coat.

2. Description of the Prior Art

Pet shampoo, flea dip, cologne and other related pet care products are extremely well known and widely used by animal owners, veterinarians, and pet grooming services. Ordinarily, the application of these liquid substances to the animal's hair or fur coat is accomplished by either spraying or pouring the substance directly from a container onto the animal's coat.

Commonly, the application of flea pesticides such as flea dip to an animal's exterior hair or fur coat is accomplished by the spraying of a liquid pesticide which is poisonous and should not be swallowed or inhaled. A common problem associated with this method of application, is the discomfort it causes animals due to irritation of the eyes and inhalation of the flea pesticide when sprayed around the animal's head and neck area.

Another problem associated with the prior art is encountered when washing an animal's fur with shampoo. Commonly, pet owners and veterinarians apply shampoo to an animal's coat by pouring it directly on the animal's hair and spreading the shampoo with both hands, working it into a lather. However, because most animals have a very dense coat, this method of application often causes higher concentrations of shampoo to become clogged in isolated areas where it was first applied, thereby making it difficult to remove during rinsing.

Accordingly, there is an obvious need for a pet grooming kit including an applicator which can evenly apply various liquid treatment substances to an animal's coat during grooming without causing irritation to the animal's eyes or lungs.

SUMMARY OF THE INVENTION

The present invention relates to a pet grooming kit for use in applying shampoo, flea pesticides, such as flea dip, and other related pet treatment substances to an animal's coat. The pet grooming kit includes a portable carrying case containing a plurality of containers filled with various liquid pet treatment substances and a liquid applicator which is adapted to be connected to the containers, wherein the liquid treatment substances within the containers can be readily applied to the exterior portions of an animal's body.

In a preferred embodiment, the liquid applicator is generally in the form of a brush and includes a hollow neck portion in fluid communication with a hollow interior reservoir, wherein the hollow neck includes a threaded interior surface adapted for threaded engagement with a spout on each of the containers. The containers are generally configured to include an elongated body portion which serves as a handle to be grasped by the user when the applicator is attached thereto. During use, the user would attach the applicator to one of the containers depending upon which treatment substance is desired to be applied, and while grasping the elongated body portion of the container, the user would brush the applicator over an animal's coat. To apply the liquid treatment such as flea dip, the user would squeeze the container while brushing, thereby forcing the liquid into the hollow reservoir of the applicator and out through the ends of bristles extending therefrom. In this manner, the liquid treatment substance can be applied evenly over the exterior of the animal's body while at the same time, brushing the animal's coat to remove loose hairs.

BRIEF DESCRIPTION OF THE DRAWINGS

For a fuller understanding of the nature of the present invention, reference should be had to the following detailed description taken in connection with the accompanying drawings in which:

FIG. 1 is a perspective view of the pet grooming kit showing the plurality of containers and liquid applicator housed within the portable carrying case.

FIG. 2 is a top view in partial cross-section of the liquid applicator showing the interior veins of the bristles in liquid receiving relation with the hollow reservoir in the applicator.

FIG. 3 is a cross-sectional view of a bristle on the applicator taken along line 3—3 in FIG. 4 and looking in the direction of the arrows.

FIG. 4 is a side view in partial cross-section showing the liquid applicator threadably connected to a container with the hollow interior of the applicator in fluid communication with the contents in the container.

Like reference symbols refer to like parts throughout the several views of the drawings.

DETAILED DESCRIPTION OF THE PREFERRED EMBODIMENT

As shown in FIG. 1, the preferred embodiment of the present invention relates to a pet grooming kit generally indicated as 10, the kit being specifically adapted to facilitate the application of various liquid pet care substances to an animal's coat. The pet grooming kit 10 includes a portable carrying case 14 having an interior compartment 16 and an exterior protective shell 18. The carrying case includes handles 19 and 19' to facilitate easy transport of the grooming kit. The interior compartment 16 of the carrying case 14 includes preformed recesses to house and support a plurality of containers 22, 22' and 22" and a liquid applicator 30.

Each of the containers 22, 22' and 22" would normally contain some kind of liquid pet treatment substance such as shampoo, flea dip, pet cologne or other related pet treatment substances which are normally applied to an animal's coat for grooming purposes. Each of the containers in the pet grooming kit is configured to have an elongate body portion 24 to enable the user to grasp the container in one hand, and a tubular spout 26 formed in an upper end of the container 22. The tubular spout 26 includes a threaded portion 27 and an open end 28 which is normally sealed when not in use to prevent the liquid contents from spilling from within the container.

With reference to FIGS. 2 and 4, the liquid applicator 30 is generally in the form of a brush having a head portion 32, a neck portion 34 and a plurality of bristles 36 extending outwardly from a bottom side 31 of the head portion. The liquid applicator 30 includes a hollow interior disposed within the head portion which is structured and configured to define a liquid reservoir 38 which is in fluid communication with the tubular neck portion 34. The tubular neck portion 34 includes an open end 40 and a threaded interior surface 42 which is specifically adapted for interconnection with the threaded tubular spout on each of the containers 22, 22' and 22". Each of the plurality of bristles 36 includes an interior vein 39 extending axially through the entire length of the bristles, the veins being in liquid receiving relation to the liquid reservoir 38 in the head portion 32 of the applicator 30.

In use, one of the plurality of containers 22, 22' or 22" is threadably attached to the liquid applicator as shown in FIG. 4, the particular container attached dependent upon the type of treatment which is desired to be administered to the animal being treated. When attached, the container serves as the handle portion of the applicator 30 and the elongate body 24 of the container is normally sized to fit within one hand of the user. To apply shampoo, flea dip or other liquid substances to the animal's coat, the user simply squeezes the elongate body 24 of the container thereby forcing the liquid contents out of the tubular spout 26 through the neck portion 34 of the applicator 30 and into the liquid reservoir 38, as indicated by the arrow 46 in FIG. 4.

Once within the liquid reservoir 38, the liquid being forced from the container is then directed into the veins 39 of each of the plurality of bristles 36 as shown in FIG. 3. As the liquid exits the vein 39 in each of the bristles 36, it enters a liquid disbursing means 48 which is generally configured in the shape of a hollow sphere and includes a plurality of small apertures 49 extending therethrough. Upon squeezing the container 22, 22' or 22", liquid is forced out of the apertures 49 in the liquid disbursing means where it exits in the form of a spray as indicated by the broken lines 50 in FIG. 3.

In use, the liquid applicator 30 of the preferred embodiment would be threadably attached to a container having shampoo, flea dip or some other pet treatment substances therein and while brushing the bristles 36 along the animal's coat, the user could simply squeeze the container forcing the liquid contents out of the liquid disbursing means 48 on each of the bristles 36 applying the liquid substance evenly throughout the animal's hair or fur without disbursing the substance into the surrounding atmosphere.

Now that the invention has been described,
What is claimed is:

1. A pet grooming kit for use in applying shampoo, flea pesticides and other related liquid substances to an animal's coat, comprising:
   a. A portable carrying case including an interior compartment and an exterior shell structure having a handle attached thereto,
   b. a plurality of containers formed of a flexible material, for containment of a liquid therein, each of said containers having an elongate body with a threaded tubular spout formed at an upper distal end thereof,
   c. a liquid applicator means including a head portion and a tubular neck portion having a threaded interior surface adapted for threaded engagement with said threaded tubular spout, said head portion including a hollow interior defining a reservoir for receiving liquid from a container,
   d. said tubular neck portion on said liquid applicator means being formed and configured for liquid receiving engagement with said tubular spout on each of said plurality of containers,
   e. a plurality of bristles connected to an extending outwardly from a bottom surface of said head portion in perpendicular relation thereto, said plurality of bristles arranged in a plurality of rows in spaced relation throughout the bottom surface,
   f. each of said bristles including an interior vein extending axially through the entire length of a bristle and in liquid receiving relation to the hollow interior of said liquid applicator means and being structured to permit passage of liquid therethrough, and
   g. liquid disbursing means including a hollow sphere disposed on a distal end of each of said plurality of bristles in liquid receiving relation to said interior vein, said hollow sphere including a plurality of small apertures structured and configured to evenly disburse the liquid in a multi-directional manner as the liquid exits from within the vein.

2. A pet grooming kit as in claim 1 wherein said interior compartment of said portable carrying case includes preformed recesses to house and support said plurality of containers and said liquid applicator means.

3. A pet grooming kit as in claim 2 wherein said liquid applicator means is generally in the form of a pet grooming brush with said plurality of bristles disposed and configured to permit brushing of an animal's coat.

4. A pet grooming kit as in claim 1 wherein said elongate body on each of said plurality of containers is structured to facilitate grasping by a user's hands.

5. A pet grooming kit as in claim 4 wherein said elongate body on each of said plurality of containers defines a handle portion when said liquid applicator means is connected thereto.

6. A pet grooming kit as in claim 5 wherein one of said plurality of containers contains shampoo therein.

7. A pet grooming kit as in claim 5 wherein one of said plurality of containers contains a liquid flea pesticide therein.

8. A pet grooming kit as in claim 5 wherein one of said plurality of containers contains pet cologne therein.

9. A pet grooming kit as in claim 1 wherein said plurality of containers are formed of a substantially rigid material to retain their shape and having sufficient flexibility to allow the contained liquid to be forced out of said tubular spout upon squeezing said elongate body.

* * * * *